United States Patent [19]

Starnes

[11] 4,317,025
[45] Feb. 23, 1982

[54] LOW WATTAGE ELECTRIC OVEN FOR MOBILE VEHICLES

[76] Inventor: Roger A. Starnes, 4502 Sudbury Rd., Doraville, Ga. 30360

[21] Appl. No.: 108,564

[22] Filed: Dec. 31, 1979

[51] Int. Cl.³ .................. A21B 1/22; F24C 15/32; F27D 21/02
[52] U.S. Cl. ................... 219/202; 126/21 A; 126/37 R; 219/386; 219/391; 219/400; 219/408; 219/413; 312/236; 362/94
[58] Field of Search ............... 219/385–387, 219/391–393, 400, 413, 414, 402–411; 126/37 R, 190, 21 A; 312/236; 362/94

[56] References Cited

U.S. PATENT DOCUMENTS

| | | | |
|---|---|---|---|
| 1,001,637 | 8/1911 | Gray | 219/400 |
| 1,069,441 | 8/1913 | Lawrence | 219/400 X |
| 1,554,365 | 9/1925 | Parker et al. | 219/386 X |
| 2,025,515 | 12/1935 | Meridith-Jones | 219/400 |
| 2,205,884 | 6/1940 | Greenman | 219/386 X |
| 2,279,064 | 4/1942 | Rutenber | 219/414 |
| 2,408,295 | 9/1946 | Cossin | 362/94 X |
| 2,499,525 | 3/1950 | Person | 126/21 A |
| 2,672,548 | 3/1954 | Bjorklund | 219/400 |
| 3,149,624 | 9/1964 | Reeves | 126/190 X |
| 3,692,975 | 9/1972 | Markus et al. | 219/202 |

FOREIGN PATENT DOCUMENTS

| | | | |
|---|---|---|---|
| 22402 | of 1914 | United Kingdom | 219/400 |
| 490624 | 8/1938 | United Kingdom | 219/400 |
| 513684 | 10/1939 | United Kingdom | 219/400 |
| 664461 | 1/1952 | United Kingdom | 219/400 |

*Primary Examiner*—A. Bartis
*Attorney, Agent, or Firm*—James B. Middleton

[57] ABSTRACT

An electrically heated oven for mobile vehicles, such as vans or recreational vehicles, includes a tightly closed oven compartment divided by an internal, imperforate, vertical secondary wall spaced from the back wall of the oven into a front cooking chamber and a rear heater chamber. A thermostatically controlled, plate-like, low wattage electric resistance heating element operable at the vehicle voltage is located within the heater chamber intermediate the upper and lower edges of the secondary wall, which edges are spaced from the top and bottom walls of the oven to allow convection air flow between the cooking and heater chambers. The front surface of the secondary wall is dull and roughened to readily dissipate heat into the cooking chamber and the rear surface of the secondary wall is smooth and shiny to minimize absorption of heat thereby from the heating element. The oven is mounted from a face plate for easy installation into the vehicle. The cooking chamber is illuminated by an electric lamp external of the oven top wall and operable at the vehicle voltage. The oven walls are covered by thick thermal insulation to minimize heat losses.

1 Claim, 5 Drawing Figures

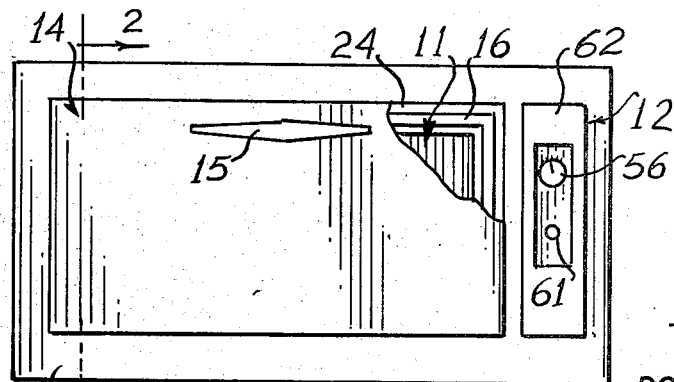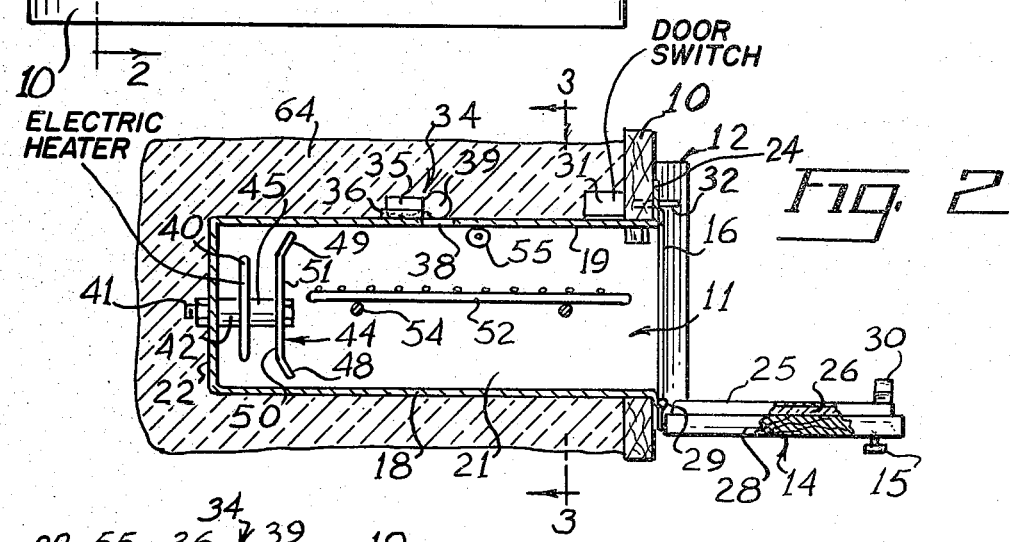

1

LOW WATTAGE ELECTRIC OVEN FOR MOBILE VEHICLES

FIELD OF THE INVENTION

This invention relates generally to ovens for cooking, and is more particularly concerned with an oven for vans and other mobile vehicles, the oven being adapted for use with low voltage power supplies.

BACKGROUND OF THE INVENTION

Vans and other recreational vehicles have become extremely popular, and have previously been furnished with numerous appliances and the like. When any form of cooking appliance has been used in vans and recreational vehicles, the source of heat has generally been gas, unless the device is adapted to operate on a power supply from a camping site hookup. It will of course be obvious that the reason appliances that utilize a high intensity of heat generally do not work off the electrical system of the vehicle is because of the large amount of power required, and the fact that the vehicle normally has a 12 volt, direct current, electrical system. As a result, to obtain a large quantity of power, the current would be extremely large due to the relatively low voltage utilized.

Once vans and other recreational vehicles are used extensively for long trips, and for family trips, it is frequently desirable to have some means for cooking while the vehicle is traveling. Obviously, the use of an open flame, as would be the case with a gas heating device, would be quite hazardous to use while the vehicle is in motion. Also, it will be understood that no outside power source is available, so appliances requiring the power from the campsite hookups cannot be used while the vehicle is in motion. As a result, heating devices utilized while a vehicle is in motion have normally been limited to extremely small devices such as baby bottle warmers and the like which cannot be practicably used to prepare food for adults.

SUMMARY OF THE INVENTION

The present invention overcomes the above-mentioned and other difficulties with the prior art cooking devices by providing an oven for installation in vans and other vehicles, the oven of the present invention having an electric heating element for operation on the vehicle's electrical system, the heating element being thermostatically controlled in response to oven temperature and of a relatively low wattage. The heating element is arranged between a wall of the oven and a baffle plate, the baffle plate having a shiny surface facing the heating element and a dull surface on the opposite side, to produce a chimney effect and assure that the contents of the oven are heated with convection currents, and the convection currents are sufficient that the baffle plate remains at a temperature no higher than the oven temperature. The oven of the present invention also includes a novel lighting arrangement for the interior of the oven wherein the light is mounted on the exterior of the oven, is thermally insulated from the oven, and is operable from the vehicle power supply, and the oven includes an outer panel to be decorated in accordance with the decor of the interior of the vehicle.

BRIEF DESCRIPTION OF THE DRAWINGS

These and other features and advantages of the present invention will become apparent from consideration of the following specification when taken in conjunction with the accompanying drawings in which:

FIG. 1 is a front elevational view of an oven made in accordance with the present invention, the door thereof being partially broken away;

FIG. 2 is a cross-sectional view taken substantially along the lines 2—2 in FIG. 1, the oven in FIG. 2 being shown with the door open;

FIG. 3 is a cross-sectional view taken substantially along the line 3—3 in FIG. 2 of the drawings with the shelf removed; and FIG. 4 is a schematic circuit diagram showing the electrical controls for the oven shown in FIGS. 1-3; and FIG. 5 is a highly enlarged, fragmentary cross-sectional view of the baffle plate.

DESCRIPTION OF THE PREFERRED EMBODIMENT

Referring now more particularly to the drawings, and to that embodiment of the invention here chosen by way of illustration, it will be seen in FIG. 1 of the drawings that the oven includes a face plate 10 surrounding the cooking chamber, or oven proper 11, and containing the oven control 12. The oven 11 is provided with a door 14 having an appropriate handle 15. A gasket 16 is fixed adjacent to the oven 11 to be engaged by the door 14.

Attention is next directed primarily to FIGS. 2 and 3 of the drawings which show longitudinal and transverse cross-sectional views of the oven shown in FIG. 1. Here it will be seen that the chamber 11 is formed of metal, and includes a bottom 18 and a top 19, and side walls 20 and 21. The rear of the chamber is closed by a back 22. There is a front flange 24 which surrounds the open front of the oven, the flange 24 over-lying the face plate 10 for mounting the oven 11 to the face plate 10.

The door 14 includes a liner 25 which directly engages the gasket 16. The liner 25 is made of metal or the like to withstand the heat of the oven, and is hollow inside, the cavity being filled with insulation 26. The outer surface of the door 14, in one successful embodiment, is made of a wooden panel 28. Thus, the liner 25 is fixed to the wooden panel 28, and the wooden panel 28 is hinged by hinges 29 to the flange 24. Due to the arrangement, the door 14 will pivot to the closed position as shown in FIG. 1 of the drawings so that the catch assembly 30 will retain the door in a closed position. When the door 14 is opened, as shown in FIG. 2 of the drawings, the wooden panel 28 will abut the lower flange 24 so that the door 14 will remain in the horizontal position as shown in FIG. 2. Those skilled in the art will realize that, as is conventional, the gasket 16 extends around three sides of the oven, no gasket being required at the bottom edge since heat rises and the hot air will not fall through an opening at the bottom of the door.

Also shown in FIG. 2 of the drawings, there is a switch 31 having a plunger 32 for operation of the switch 31. The plunger 32 is located to be engaged by the door 14 when the door is moved to its closed position. The switch 31 is designed to operate the oven light 34.

It will be remembered that the oven of the present invention is designed to be installed in a vehicle having a 12 volt electrical system, and high temperature bulbs may not be readily available. Even so, a high temperature bulb would be more expensive than a conventional 12 volt bulb as is normally used in vehicles. To avoid the necessity of using a high temperature bulb, the lamp 34 is here arranged with the socket 35 mounted on a block 36, the block 36 being affixed to the top 19 of the oven 11. The block 36 may be any of numerous materials, but it is contemplated that the block 36 will be a material that will withstand the high temperature of the oven wall and insulate the socket 35 from this heat. It has been found that a foamed silicone will achieve the insulation as well as given a shock absorbing property. For the lamp 34 to light the interior of the oven 11, it will be seen that there is a hole 38 in the top 19 of the oven, and the bulb 39 is disposed directly above the hole 38. If desired, the bulb 39 can be further protected from the heat of the oven by installing a high temperature glass in the hole 38.

The heating element for the oven 11 is in the form of a plate 40. Those skilled in the art will realize that heating elements such as the element 40 are available in numerous shapes and sizes, and comprise generally a heating element enclosed within an outer casing. The various elements such as the element 40 are provided with appropriate mounting means, such as holes therethrough, along with appropriate terminals for connection of the electric power supply.

The particular element 40 chosen for the oven of the present invention is generally rectangular to extend along the rear wall 22 of the oven 11, and the element 40 is provided with a pair of holes through which mounting screws 41 extend.

As is shown in FIGS. 2 and 3 of the drawings, the heating element 40 is mounted by screws 41 from the rear wall 22 of the oven 11, and there is a spacer 42 between the wall 22 and the heating element 40 to space the heating element 40 from the rear wall 22. There is a secondary wall member 44 which is also mounted on the screws 41, and is spaced inwardly of the heating element 40 by spacer members 45. The secondary wall member 44 includes a central vertical web 46 with inwardly turned, upper and lower flanges 48 and 49.

From the foregoing it will be understood that the heating element 40 will be heated when connected to an appropriate electrical power source. Since the heating element 40 is confined between the rear wall 22 of the oven 11 and the secondary wall 44, it will be seen that the space between these two wall elements will be heated so that air will rise to the top of the chamber 11. Due to the construction of the secondary wall 44, the cooler air at the bottom of the chamber 11 can pass between the flange 48 and the bottom 18 of the oven, the air will be heated by the heating element 40, and the heated air will pass between the flange 49 and the top 19 of the chamber 11. Thus, the arrangement provides a chimney effect, and air will circulate through the chamber 11.

It should also be understood that the rear surface 50 of the secondary wall 44 is smooth and reasonably shiny while the surface 51 of the secondary wall 44 is dull, perhaps with a brushed finish. Because of the finishes on the secondary wall member 44, it will be recognized that radiant heat from the heating element 40 will impinge on the surface 50 and be reflected back into the chimney arrangement. In the event radiant heat escapes past the secondary wall 44 and is contained in the chamber 11, when the radiant heat strikes the surface 51, the radiant heat will be absorbed by the secondary wall 44, or will be scattered sufficiently that the food within the oven will not be significantly cooked by the radiant heat. It will therefore be understood that the oven of the present invention is arranged to assure that the cooking chamber 11 is heated by convection currents, and is designed to reduce radiant heat to a minimum. Furthermore, it is contemplated that the convection currents will be passing upwardly through a chimney so that air will be constantly passed across the secondary wall 44. In addition, the shiny rear surface 50 of the secondary wall 44 is designed to reflect, rather than to absorb, heat so that the secondary wall member 44 will not be excessively hot. As a result, it will be seen that the wall 44 minimizes heating of the cooking chamber through direct radiation, and the wall 44 is arranged to be not significantly above the temperature of the oven so heating of the cooking chamber through conduction is minimized. The result of the above is that food can be placed within the oven 11, and the food will be cooked by the heated air, and by this alone. Through the use of the secondary wall 44, the food contained in metal trays and the like are prevented from engaging the heating element 40, or other surfaces that are heated above the desired temperature.

It will also be seen in FIGS. 2 and 3 of the drawings that the oven may be provided with a rack 52 which may be supported by a plurality of pins 54 extending from the side walls 20 and 21.

To control the temperature of the oven 11, there is a substantially conventional sensing element 55 extending along the top of the oven 11. The control circuitry associated with the sensing element 55 is shown in FIG. 4 of the drawings where it will be seen that a thermostatic control device 56 has the sensing element 55 connected thereto. The device 56 is conventional, and those skilled in the art will understand that when the sensing element 55 is at a temperature below the temperature selected on the dial of the device 56, the device 56 will operate to close a switch contact, here designated at 58. Since this arrangement is conventional, no further description of the particular apparatus is thought to be necessary.

The arrangement used in the present invention utilizes the switch contact 58 to connect one side of the voltage source to a relay 59 having a switch contact 60 associated therewith. It will be noticed also that there is a lamp 61 connected in parallel with the relay coil 59, the lamp 61 being a pilot light to show that the heating device is in operation.

It will be understood that the switch 58 may be used directly to energize a load; however, on conventional devices such as the thermostatic control device 56, the switch contact 58 is frequently not designed to handle the low voltage direct current at the high amperage involved. Because of this, the switch contact 58 is used to energize the relay 59 which has a switch contact 60 of appropriate design for the direct current, and large amperage. It will be seen that the switch contact 60 is connected to one side of the heating element 40, and the other side of the heating element 40 is connected to ground as is conventional in vehicular electrical systems.

Attention is again directed to FIG. 1 of the drawings where it will be seen that the thermostatic control device 56 takes up a portion of the control panel 12, and the pilot lamp 61 is mounted directly below the control unit 56. It is contemplated that the control panel 12 will include the thermostatic control device 56 as well as the relay 59, so that the entire control for the oven is contained within the unit 12.

It will also be noticed that the framing for the control unit 12 is designed to be matched with the rest of the oven. Specifically, since it is contemplated that the outer panel 28 of the door 14 will be made of wood, it is contemplated that the framing 62 for the control unit 12 will also be made of wood, and will be stained, painted or otherwise decorated the same as the door 14.

From the foregoing it should now be understood that the oven of the present invention provides a very simple oven admirably adapted to use in vehicles and the like having 12 volt electrical systems. The oven has relatively thick insulation 64 surrounding the oven 11 to prevent loss of heat through the walls of the oven, and the door 14 has the insulation 26 as well as the wooden panel 28 to prevent escape of heat through the front of the oven. This renders the oven energy efficient in that there is very little heat loss. In addition, it is contemplated that the heating element 40 will be approximately 200 watts so that, on a 12 volt electrical system, the current will be less than 20 amps. In a vehicular electrical system utilizing the conventional storage battery and the like, 20 amps is not an excessive current. With a heating element of this size, and the amount of insulation in the present oven, it has been found that the oven will reach a cooking temperature of approximately 350° within an hour or so. Once the oven reaches cooking temperature, very little additional power is required to maintain the oven at the cooking temperature.

It will be understood that, in an oven of the type here presented, much of the food being cooked will be such things as pre-prepared meals and dishes, perhaps frozen; therefore, one can place a tray or the like in the oven, perhaps one on the rack 52 and the other on the bottom 18 of the oven, and the oven can heat, and the food can be cooking while the vehicle is traveling down the highway. With reasonable planning, the food can be cooking between stops, and the food will be ready to eat when the parties arrive at the destination, or some reasonable stopping place.

It will of course be understood by those skilled in the art that the particular embodiment of the invention here presented is by way of illustration only, and is meant to be in no way restrictive; therefore, numerous changes and modifications may be made, and the full use of equivalents resorted to, without departing from the spirit or the scope of the invention as defined in the appended claims.

I claim:

1. An oven for mobile vehicles and the like for operation from the vehicle's electrical system, said oven including a cooking chamber defined by a top and bottom, side walls connecting said top and bottom, and a back closing the rear of said cooking chamber, a face plate carrying said top and bottom and said side walls for mounting said oven within a vehicle, said face plate defining an opening therein for providing access to said cooking chamber, a door hinged to said face plate for selectively closing said opening, catch means for holding said door tightly closed, and sealing means between said door and said face plate to prevent heat loss, a secondary wall generally parallel to and spaced inwardly from said back, said secondary wall extending substantially the width of said cooking chamber and having less height than said cooking chamber, a low wattage electrical heating element operable on the voltage of a vehicle's electrical system for heating said cooking chamber, said electrical heating element being plate-like and mounted between said back and said secondary wall parallel to said secondary wall, the arrangement being such that air currents can pass beneath said secondary wall to be heated by said heating element and can pass over said secondary wall and into said cooking chamber, said secondary wall having a rear surface facing said heating element and a front surface facing said cooking chamber, said rear surface being smooth and shiny to reflect radiant heat, said front surface being dull and roughened to readily dissipate heat therefrom into the cooking chamber, so that said secondary wall will have a temperature no higher than the temperature of said cooking chamber, and a light operable on a vehicle's electrical system for selectively illuminating said cooking chamber, said light including a light socket and a bulb, said light socket being mounted on said top, outside said cooking chamber, a heat insulator disposed between said light socket and said top, and a hole defined in said top aligned with said bulb for admitting light into said cooking chamber, a temperature sensing means disposed within said cooking chamber and control means for selectively energizing said heating element in response to said temperature sensing means, and thick thermal insulation covering said walls, said top and bottom and said back of said oven, said light being between said insulation and said top.

* * * * *